United States Patent [19]

Haeck

[11] 4,308,475
[45] Dec. 29, 1981

[54] SOLENOID PUMP ADAPTED FOR NOISELESS OPERATION

[75] Inventor: Paul J. Haeck, Rockford, Ill.

[73] Assignee: Sundstrand Corporation, Rockford, Ill.

[21] Appl. No.: 925,731

[22] Filed: Jul. 18, 1978

[51] Int. Cl.³ .......................................... H02K 33/02
[52] U.S. Cl. ...................................... 310/30; 310/23; 310/34; 318/123; 318/124; 417/416; 417/417
[58] Field of Search ............ 417/311, 415, 416, 417, 417/418; 310/24, 23, 30, 34, 35; 318/119, 130, 132, 123, 124

[56] References Cited

U.S. PATENT DOCUMENTS

| | | | |
|---|---|---|---|
| 3,201,670 | 8/1968 | Myers | 310/30 X |
| 3,755,700 | 8/1973 | Buschman et al. | 310/30 |
| 3,874,822 | 4/1975 | Nakamura | 417/311 |
| 3,877,841 | 4/1975 | Nakamura | 417/311 |
| 3,894,817 | 7/1975 | Majoros et al. | 310/30 X |
| 4,010,390 | 3/1977 | Stampfli | 310/30 |

Primary Examiner—Donovan F. Duggan
Attorney, Agent, or Firm—Wegner, Stellman, McCord, Wiles & Wood

[57] ABSTRACT

A solenoid-actuated fluid pump having reciprocable armature operable by a magnetic circuit and with structure in the flux path at the upper and lower air gaps to substantially change the reluctance across the air gaps as the armature moves beyond a predetermined location. The armature has slots for passage of fluid therethrough and which have a C-shaped cross-section to minimize the air gaps.

7 Claims, 5 Drawing Figures

SOLENOID PUMP ADAPTED FOR NOISELESS OPERATION

TECHNICAL FIELD

The present invention relates generally to solenoid-actuated hydraulic pumps such as fuel oil pumps energized by half-wave rectified alternating current.

BACKGROUND ART

U.S. Pat. Nos. 3,874,822 and 3,877,841 disclose one form of prior art solenoid-actuated fuel oil pump in which an electromagnetic plunger or armature surrounded by an electromagnetic coil is supported within a main pumping chamber by coil springs abutting opposite ends of the armature. Connected to the lower end of the armature is a pressure plunger or piston whose lower end telescopes into an intake pressure chamber. The latter is separated from the main pumping chamber by a check valve on the discharge side of the intake pressure chamber. Another check valve on the suction or inlet side of the intake pressure chamber keeps fluid from being pumped back through an inlet side of the intake pressure chamber. A half-wave rectified alternating current applied to the coil provides for intermittent energization of the coil because current flows only in one direction through the coil in a cycle. When current is flowing through the coil, the armature is driven upwardly to compress the upper one of the coil springs by the electromagnetic forces resulting from energization of the coil. Then, when current flow stops, the stored forces in the upper spring push the armature downwardly, its momentum propelling it past a neutral spring force position in the main pumping chamber thereby compressing the lower coil spring. As current is reapplied to the coils, the armature again is forced upwardly against the upper spring.

In the present solenoid pump as well as the prior art pump described above, the power stroke of the piston is with the upstroke of the armature so that, as the piston enters the main pumping chamber from the intake chamber, fuel oil is forced through a longitudinal passage in the armature and out of the main pumping chamber through a hole in a magnetic force adjusting rod or plug which also serves as the upper reaction member for the upper armature spring.

DISCLOSURE OF THE INVENTION

Under normal ideal operating conditions, the travel of the armature within the main pumping chamber is limited by the hydraulic load imposed on the pump. Accordingly, the armature springs are kept from being compressed excessively. It is desirable to avoid excessive compression of the armature springs because excessive compression can cause the springs to fail prematurely and thereby render the pump inoperative. Under actual operating conditions, however, air bubbles may pass through the pump or the pump may be subjected to a period of dry operation, resulting in a momentary or extended loss of hydraulic load on the pump. Such loss of hydraulic load can cause the armature to travel beyond its normal range of movement and, should the armature move upwardly to strike against a member such as the magnetic force adjusting plug, the operation of the pump becomes undesirably noisy.

The present invention aims to eliminate the foregoing cause of noise from the operation of the solenoid pump by keeping the upper end of the armature from striking the plug yet without causing excessive compression of the armature springs by limiting upward movement of the armature to an overtravel position spaced below the lower end of the plug. To these ends in one form of the invention, the pump is uniquely constructed to reverse the directional effect of the application of magnetic forces to the armature during the upstroke of the armature under conditions absent hydraulic load so that over travel of the armature beyond its normal upper range limit is limited to a position below the magnetic force adjusting plug. Advantageously, this is achieved by constructing the components of the pump providing the magnetic circuit around the coil to produce an increase in the lower gap reluctance which exceeds a simultaneous decrease in the upper gap reluctance when the armature moves upwardly within the main pumping chamber beyond a selected position spaced above the neutral spring position and below the end plug. Because the magnetic force driving the armature results from a decrease in the over-all reluctance of the magnetic flux circuit, if the rate of decrease of the reluctance of the upper air gap is less than the rate of increase of the reluctance of the lower air gap, the magnetic force will oppose the upward movement of the armature in the event that the other portions of the flux circuit maintain substantially the same reluctance. As a result, when the armature reaches that predetermined point where the rate of decrease in the reluctance of the upper air gap is exceeded by the rate of increase in the reluctance of the lower air gap, the magnetic forces on the armature will reverse. More particularly herein, the armature is of a preselected axial length less than the axial distance between the opposite ends of portions of the magnetic flux path through upper and lower magnetic gaps. Specifically, herein, the length of the armature is approximately equal to the axial distance between the aforementioned predetermined point of magnetic force reversal in the pumping chamber and the opposite end of the flux path portion through the lower magnetic gap.

Additionally, by virtue of the configuration of the magnetic pump component associated with the upper magnetic gap, advantage is taken of magnetic flux saturation of a section of such component to further reduce the rate of decrease in the upper air gap reluctance relative to the simultaneous rate of increase of the lower gap reluctance thereby lowering the magnitude of the magnetic force applied to the armature. Prior to saturation, this component section advantageously limits the reluctance across the upper magnetic gap to a low value and thus provides for a relatively high magnetic flux density across the upper gap so that, for instance in starting the pump, a high magnetic force is generated to move the armature from its neutral position. Preferably, herein the saturable component section is in the form of an annular lip projecting downwardly from the magnetic force adjusting plug.

In another form of the present invention, dashpot means are provided in the upper end of the main pumping chamber to coact between the upper end of the armature and the end plug to limit upward movement of the armature in the chamber to the aforementioned overtravel position. Advantageously, herein, the dashpot is defined by a recess in the armature which retains both the lower end of the upper armature spring and a quantity of fuel oil. The plug lip also is sized to telescope with the recess in the overtravel position and thereby limit upward movement of the plug by damping flow of oil from the recess.

The provision of uniquely shaped flow passages in the periphery of the armature is a further advantageous effect of the present invention in providing for straight flow through of fuel from one end of the armature to the other while avoiding a significant increase in the area of the magnetic gaps, particularly the lower magnetic gap. Herein, the circumferential width of each of such flow passages at the periphery of the armature is less than the maximum circumferential of the passage's width in the interior of the armature.

The foregoing and other advantageous effects of the present invention will become more apparent from the following description of the best mode of the invention when read in conjunction with the accompanying drawings.

BEST MODE FOR CARRYING OUT THE INVENTION

Figure 1:
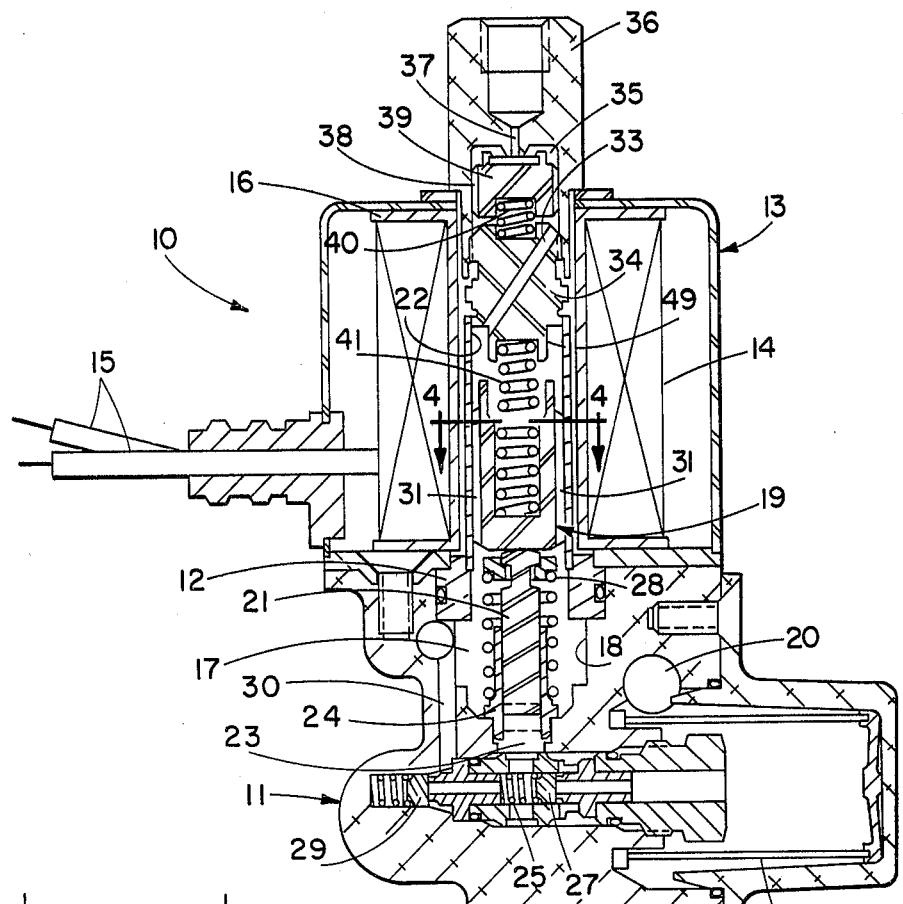
FIG. 1 is a cross-sectional view of a solenoid pump embodying the novel features of the present invention.

As shown in the drawings for purposes of illustration, the present invention is embodied in a solenoid-actuated hydraulic pump 10 such as may be used in pumping a low volume of fuel oil from a tank (not shown) to a burner nozzle (not shown) of a household furnace. Herein, the pump includes a body 11 with a magnetic housing 13 attached thereto and containing an electromagnetic coil 14. The coil is connectable through lead wires 15 to a source (not shown) of half-wave rectified alternating current which provides the power for the pump. More particularly, the coil is supported within the housing 13 on a nonmagnetic spool 16 which is attached to the inside surfaces of the housing. The central aperture of the spool as well as a recess 18 in the pump body define a pumping chamber 17 and a nonmagnetic sleeve 22 telescoped within the spool aperture and recess receives movable means including a generally cylindrical armature 19 adapted for reciprocation in the chamber with the intermittent energization of the coil 14 by the half-wave rectified current. A magnetic circuit (see FIG. 2) in the pump is completed through the armature 19, an end plug 34 in the upper end of the main pumping chamber 17, the housing 13 and a sealing ring 12 connected to the housing and telescoped into sealing engagement with the recess 18.

In operation, hydraulic fluid in the form of fuel oil is drawn from the fuel tank (not shown) through an inlet bore 20 in the pump body with each upstroke of the armature 19. To provide the suction force for drawing in fuel oil through the bore 20, a smaller diameter piston or plunger 21 reciprocates with the armature within an intake chamber 23 that is separated from the main pumping chamber 17 by a cylinder 24. The lower end of the intake chamber 23 communicates with a passage 25 in turn communicable with bore 20 for delivering fuel oil to the intake chamber by way of an intake check valve 27. The piston 21 is formed separate from the armature 19 but is urged continuously against the lower end of the armature by a spring 28. A strainer 26 between the passage and the bore 20 provides for filtration of the incoming fuel oil and the intake check valve 27 which is spring loaded closed and is located upstream of the intake chamber in the passage 25 keeps fuel oil from flowing out of the intake chamber toward the strainer with each downstroke of the piston 21.

Immediately downstream of the intake chamber 23 within the passage 25 is located a discharge check valve 29 spring loaded closed and through which fuel is ported to a bore 30 communicating with the lower end of the main pumping chamber 17. Accordingly, with each downstroke of the piston 21 the volume of fluid previously drawn into the intake chamber 23 by upward movement of the piston between the upper and lower phantom line positions shown in FIG. 1, is pumped across the discharge check valve 29 and into the main pumping chamber. Then, with the next upstroke of the piston 21, the same volume of oil is driven from the main pumping chamber by the piston 21 as a portion of the piston enters the main pumping chamber from the intake chamber 23.

Figure 4:
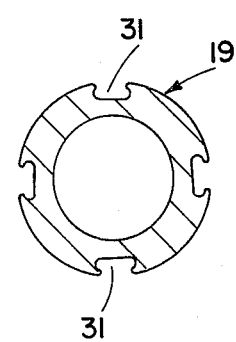
FIG. 4 is a cross-sectional view of the armature taken substantially along line 4.4 of FIG. 1.

In flowing from the inlet end of the main pumping chamber 17 torward the upper outlet end of the chamber 17, the fuel oil passes through a series of peripheral slots or passages 31 formed in the armature 19 and extending longitudinally therethrough to open at opposite ends of the armature. As seen in FIG. 4, the slots also open radially of the armature. At the outlet end of the pumping chamber 17, the fuel oil passes through a hole 33 in the magnetic end plug 34 to a discharge chamber 35 defined by the discharge fitting 36 which threadably captivates the end plug 34 within the outlet end of the main pumping chamber 17. A discharge port 37 in the fitting 36 provides communication between the chamber 35 and an outlet conduit (not shown) leading to the fuel oil burner (not shown).

Reciprocal within the discharge chamber 35 is a magnetic valve 39 having peripheral slots 38 for fuel oil to pass by the sides of the valve within the chamber during pumping. But, as shown in FIG. 1, the valve is urged into a position closing the port 37 by a spring 40 acting between the valve 39 and the end plug 34. When the coil 14 initially is energized for normal pumping operation of the pump, the valve 39 is drawn downwardly against the end plug 34 by magnetic forces overcoming the spring 40. The magnetic hysteresis characteristics of the material forming the body of the valve 39 is such that the valve remains continuously open during the application of half-wave rectified current to the coil but, when the pump is turned off, the valve 39, of course, is urged into the closed position by the spring 40 to stop the flow of fuel out of the chamber 35.

Figure 2:
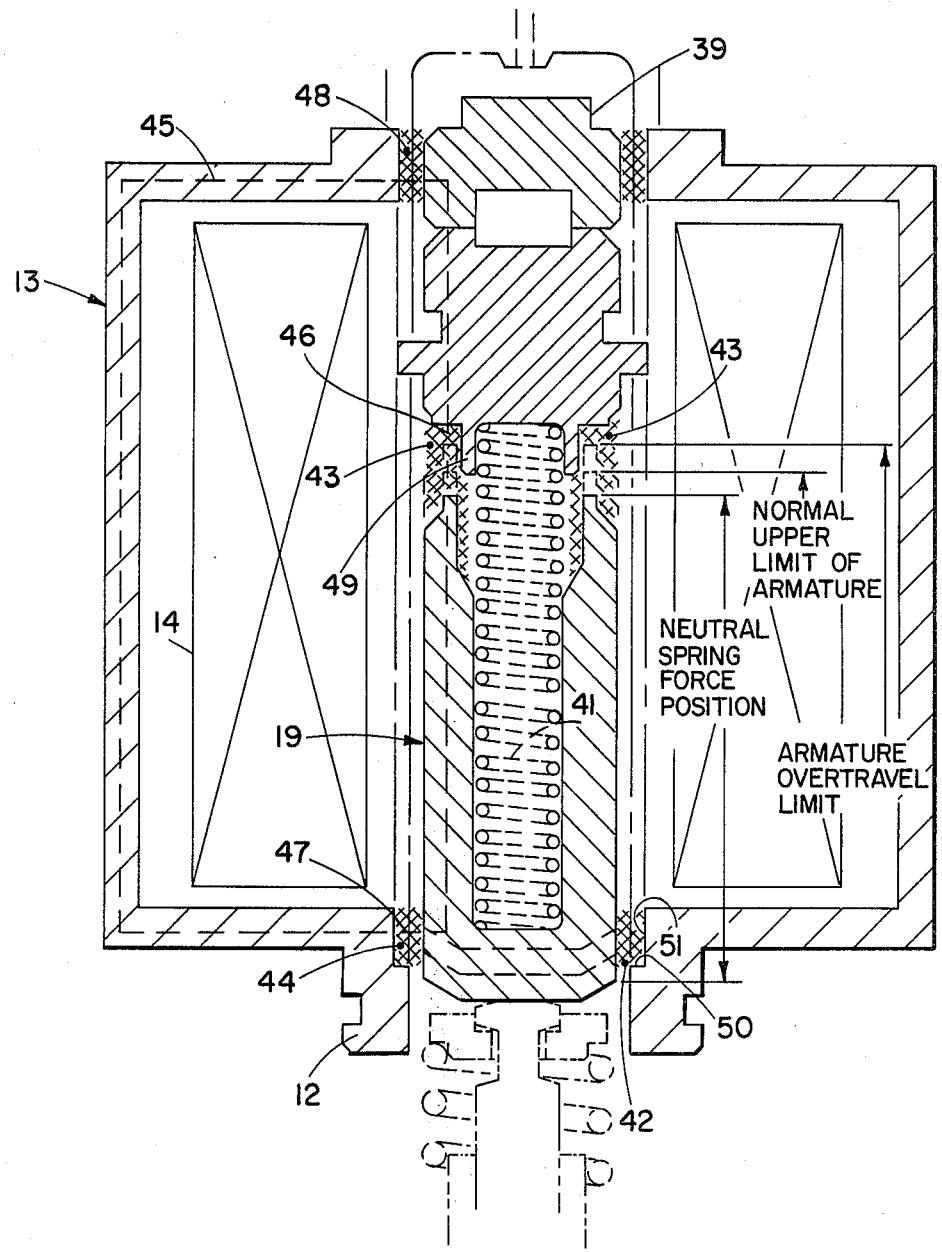
FIG. 2 is an enlarged, fragmentary, cross-sectional view similar to FIG. 1 but showing some magnetic components of the pump in moved positions and nonmagnetic parts in phantom.

In order for the armature 19 to reciprocate when half-wave rectified alternating current is applied to the coils 14 of the pump 10, the armature is urged downwardly by an upper spring 41 toward a neutral spring force position (see FIG. 2) with spring 28. In this position, the reluctance across an air gap (represented by the double cross-hatched area 43) at the upper end of the armature is much greater than the reluctance in the portion of the flux path across the annular air gap (represented by the double cross-hatched area 44 shown only in FIG. 2) adjacent the lower end of the armature. Accordingly, with the initial application of the half-wave rectified current to the coil 14, the armature is drawn upwardly (as seen in FIG. 2) by magnetic force as long as current flows through the coil due to the fact that the initial upward movement of the armature will tend to reduce the over-all reluctance of the magnetic circuit. Because current flows through the coil in only one direction during a cycle, the spring 41 causes the armature to downstroke once with each current cycle. Thus, for instance, with the sixty-cycle current, the armature and accompanying piston 21 reciprocate sixty times within each second. However, in part because of the momentum generated by the moving parts of the pump, reversal in the direction of movement of the armature at the upper end of its stroke does not occur instantaneously with the loss of current flow through the coil 14. But normally, owing to the damping effect of the oil flowing through the armature passages 31 and the work being performed by the pump in pressurizing the oil, normal upward movement of the armature under hydraulic load is limited to avoid striking the upper end of the armature against the lower end of the plug 34. However, from time to time during operation of the fuel pump of the present character, an air bubble may be transmitted through the pump or the pump may be subjected to dry operation such that the armature does not stroke against a significant, if any, hydraulic load. Under such conditions, the armature will travel upwardly beyond from its normal limits of reciprocation. Repeated, excessive compression of the operating springs of the pump can lead to spring fatigue and pump failure and, should the upper end of the armature strike against the plug 40 undesirable operating noise is generated.

The present invention contemplates utilizing the magnetic force generated by the magnetic circuit to keep the armature 19 from traveling upwardly an excessive distance beyond the normal upper limit of movement of the armature by reversing the directional effect of the magnetic force on the armature so as to keep the upper end of the armature from striking the plug 34 and creating noise and to keep the upper spring 41 from being excessively compressed and failing prematurely. For these purposes, the magnetic circuit (partially illustrated by a general magnetic flux line 45) within the pump includes a first portion 46 through the upper air gap 43 and a second portion 47 through the lower air gap 44 wherein the rate of increase in reluctance of the flux path in the lower air gap at a preselected position of the armature spaced upwardly of its neutral spring force position in the main pumping chamber 17 and below the end plug 34 exceeds the rate of decrease in reluctance across the upper air gap. By virtue of the foregoing structure, even during dry operation of the pump, the armature 19 is kept from striking the plug 34 (see armature overtravel limit FIG. 2) and the spring 41 is kept from being excessively compressed.

In the present instance, the representative general flux line 45 of the magnetic circuit for the exemplary pump is shown in FIG. 2 only and, upon progressing in a counter clockwise direction as viewed in beginning with the end plug 34, the circuit is completed along the line 45 from the upper surface of the plug to the magnetic valve 39 by face to face contact between the valve 39 and the plug during the application of half-wave rectified alternating current of the coil 14. From the valve 39, the circuit spans a fixed distance air gap 48 (double cross-hatched in FIG. 2) extending to and through the magnetic housing 13 and the magnetic sealing ring 12 From the sealing ring, the magnetic circuit is completed along the portion 47 of the flux line 45 across the lower air gap 44 to and through the armature 19. At the upper end of the armature, the magnetic circuit finally is closed along the portion 46 of the flux line 45 through the upper air gap 43 to the end plug 34.

While the magnetic circuit herein is represented by a dashed line, it will be appreciated that the total magnetic flux within the circuit occupies three dimensional space thus giving the flux path within the fixed gap 48, a constant, generally sleeve-like configuration. The flux path in the air gap 43, however varies in size and density with movement of the armature 19 in the pumping chamber 17. Herein, reversal in the directional effect of the magnetic force is obtained by also varying the dimensions of the lower air gap 44 with armature movement. Specifically, the length of the lower air gap is varied such that at a selected armature position spaced upwardly of the neutral spring force position and below the end plug 34, the rate of change in the total reluctance of the magnetic curcuit reverses direction, thus reversing the directional effect of the magnetic force on the armature 19.

The foregoing may be understood more readily with the following explanation and knowledge that the magnetic force ($F_m$) which is applied to the armature 19 is a function of the square of the flux $\phi$ through the circuit times the rate of change in the total reluctance ($R_t$) of the circuit relative to armature movement (X), $dR_t/dx$. In addition, the magnetic flux $\phi$ is a function of the magnetomotive force (MMF) of the coil and the inverse total reluctance ($R_t$). The general magnetic force equation is expressed as follow:

$$F_m = -\tfrac{1}{2}\phi^2(dR_t/dx) = -\tfrac{1}{2}(MMF/R_t)^2(dR_t/dx) \qquad (1)$$

Additionally, the total reluctance ($R_t$) of the circuit at any position of the armature 19 is equal to the sum of the component reluctances and may be expressed by the following formula:

$$R_t = R_f + R_l + R_u + R_c \qquad (2)$$

in which
 $R_f$ represents the reluctance of the fixed gap 48,
 $R_l$ represents the reluctance of the lower gap 44,
 $R_u$ represents the reluctance of the upper gap 43, and
 $R_c$ represents the reluctance of the magnetic components of the circuit.

Moreover, the reluctance (R) for any section of the flux path is a function of its length (w), as measured longitudinally of the flux path, divided by its cross-sectional area (A) and may be obtained from the following equation:

$$R = w/Auu_o \qquad (3)$$

where
 u is the permeability of the medium through which the flux is flowing relative to free space; and
 $u_o$ is the permeability of free space, a constant.

In considering the total reluctance formula (2) as applied to the present magnetic circuit, the reluctances $R_f$ and $R_c$ can be considered to be substantially constant because the flux path length and cross-sectional area (refer to formula (3) above) within these portions of the circuit remain essentially unchanged even when the coil 14 is energized and the armature moves. Accordingly, the rate of change of the total reluctance ($R_t$) depends directly upon rate of change in the reluctance ($R_u$) and ($R_l$) of the upper and lower air gaps 43 and 44.

Herein, in order to provide a rate of change in the reluctance of the lower gap 44 which is greater than the rate of change in the reluctance of the upper gap 43 at a preselected upper position of the armature 19, the effective axial length of the armature is selected to be less than the axially measured length of the main gap as defined by the members in the flux path forming the two poles whereby the effective air gap at the upper end becomes less than the effective air gap at the lower end. The main gap in association with the armature provides the upper and lower air gaps. The armature is in a magnetically neutral position when movement in either direction will not produce a reduction in the reluctance of the magnetic circuit, taken as a whole, resulting in no magnetic force being applied to the armature. Preferably, the magnetic neutral position of the armature is located above the normal upper limit of travel of the armature. The effect of this structural feature in the operation of the present pump may be more readily understood in considering the graph shown in FIG. 3.

Figure 3:
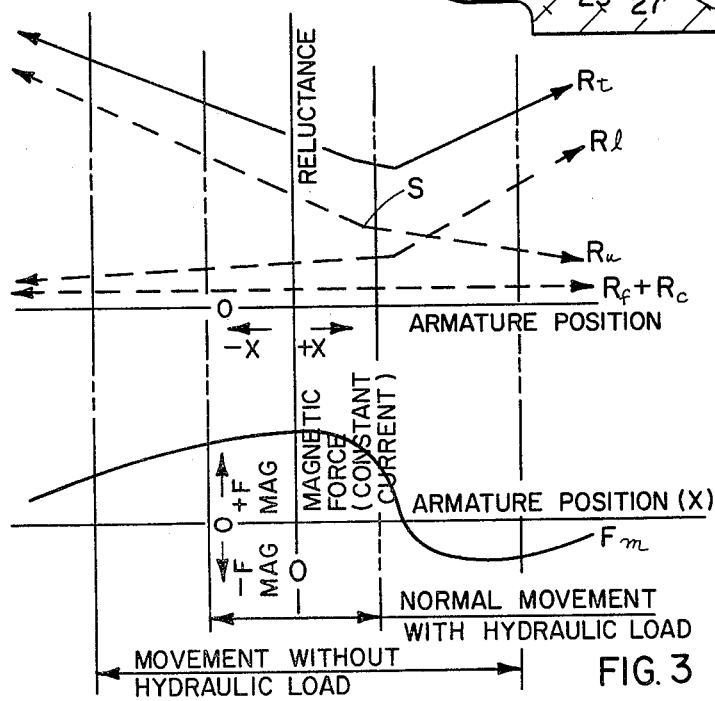
FIG. 3 illustrates, simplified, in general form curves of reluctance and magnetic force relative to armature position for the exemplary solenoid pump.

In the graph of FIG. 3, the reluctance curves for upper gap 43, the lower gap 44 and for the total reluctance are shown as straight line curves in order to aid in simplifying this description. However, it is to be noted that a true representation of these three reluctance curves would show the curves to be curvilinear rather than linear. With this in mind and considering the initial energization of the solenoid coil 14, the armature 19 is drawn upwardly from its neutral spring position by the magnetic force ($F_m$) applied to the armature in opposition to spring 41. As the armature moves upwardly, the length of the upper air gap 43 becomes shorter through the air. In accordance with the reluctance formula (3), the flux path shortens in relation to its cross-sectional area, the reluctance decreases in magnitude. The graph curve Ru represents generally the reluctance of the upper gap with respect to armature position (X). The vertical line O through the center of the curve represents the neutral spring force position with armature position above the neutral spring force position being represented as positive ($+X$) to the right and negative ($-X$) to the left. From the curve Ru it is seen that for some distance (X) if armature travel from the neutral spring force position of the armature, the rate of decrease in the reluctance associated with the upper gap is greater than the rate of increase in the reluctance of the lower air gap 44 as shown by the graph curve $R_1$. Accordingly, in the summation curve of the reluctances $R_t$, the slope of the summation curve decreases at a fairly steep rate. However, at a point S in the reluctance curve Ru, the slope of the curve flattens significantly in dictating a change in the rate of decrease in the reluctance of the upper gap 43 with respect to (X) to a lesser rate of decrease which is desirable in reducing the force ($F_m$) and hence the acceleration of the armature upwardly prior to reversing its direction of travel. Herein, this desirable change in $dR_u/dx$ is achieved through the provision of a downwardly projecting magnetic lip 49 which is integrally formed with the lower end of the plug 34. While the lip serves as a retainer for the upper end of the spring 41, it also provides for a shorter upper gap 43 upon initial energization of the coil 14 thereby limiting the reluctance across that gap to a low value so that a high magnetic force ($F_m$) is generated for moving the armature 19 upon energizing the coil 14. When the lip 49 becomes magnetically saturated, however, as is represented by the point S in the curve Ru, the lip no longer produces a reduction in reluctance with further upward movement of the armature. Therefore, any further decrease in the reluctance across the upper gap is primarily due to a reduction in the length of the air gap 43 which does not bear any substantial relation to the proximity of the upper end of the armature to the lip.

Because of the selected length of the armature 19, when the armature moves upwardly, the reluctance associated with the lower gap 44 also changes but it increases in magnitude due to the decreasing of the area A of the gap 44 with upward movement in conformity with the reluctance formula (3). Accordingly, as shown in FIG. 3, the reluctance ($R_l$) of the lower air gap 44 increases in magnitude so the slope of the curve $R_l$ is positive. At a predetermined distance upwardly from the neutral spring force position, the rate of increase of reluctance of the lower air gap increases sharply and to the extent that it exceeds the rate of decrease in the reluctance of the upper air gap for the same position of the armature 19. Herein, this increase in the rate of change of the reluctance of the lower air gap is due primarily to the passage of the lower end of the armature upwardly beyond a shoulder 50 defined by a notch 51 formed in the magnetic sealing ring 12 on the housing 13. Upon the passing upwardly of the shoulder 50, the length of the lower air gap 44 dramatically increases so that the rate of change in the reluctance of the flux path in the lower air gap with further upward movement of the armature is based upon an air gap length W significantly longer than the air gap length associated with lower positions of the armature relative to the shoulder.

Figure 5:
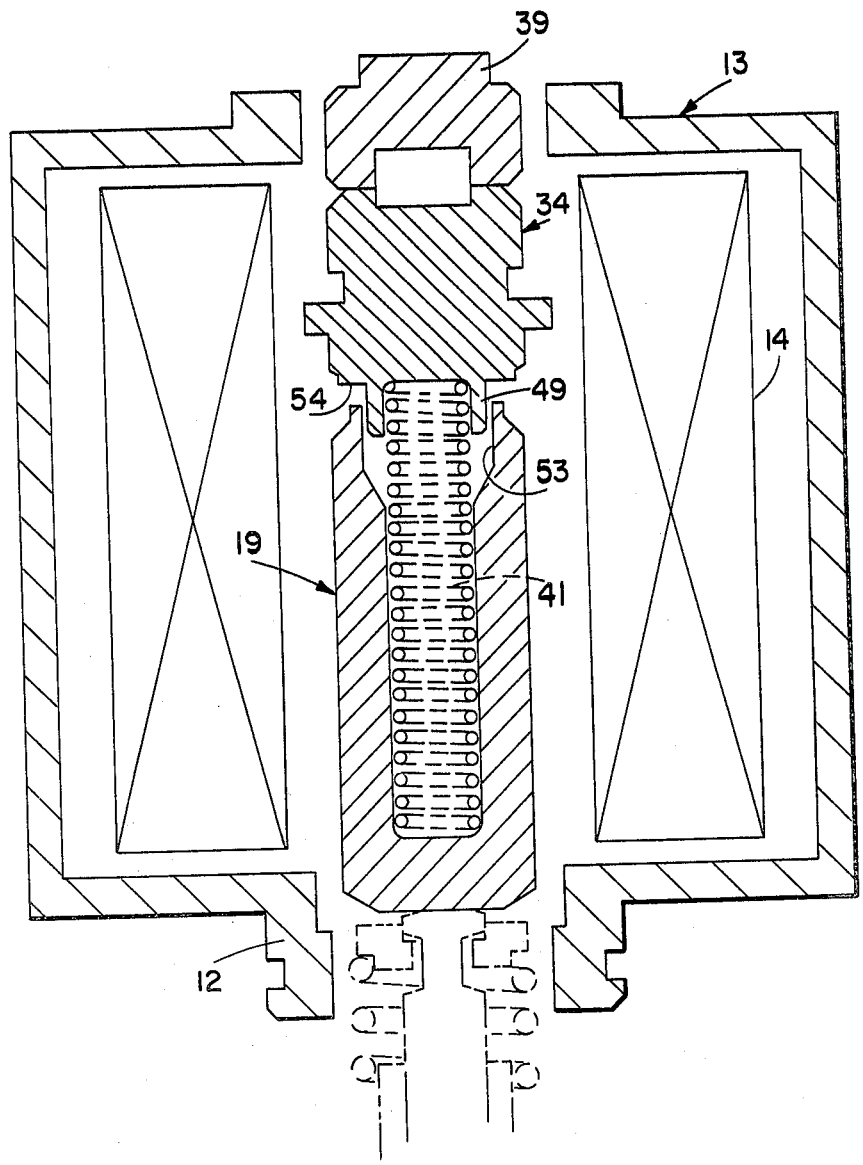
FIG. 5 is a view similar to FIG. 2 but showing the armature in a further moved position.

The present invention additionally contemplates limiting upward movement of the armature 19 to the overtravel position (see FIG. 5) through the provision of dashpot means in the upper end of the main pumping chamber 17. For this purpose, the armature is formed with an elongated, generally cylindrical recess or reservoir 53 (see FIG. 5) of the same general cross-sectional configuration but slightly larger than the lateral cross-sectional area bounded by the radially outward surface of the lip 49. The lower end of the recess is closed so that during normal operation of the pump, oil collects in the reservoir 50. However, should an air bubble pass through the pumping chamber 17 causing the armature to overtravel, the armature is limited in upward movement to an overtravel position spaced below a lower end surface 54 of the plug 34 by the damping effect produced by the oil as it is forced between the lip and the inside walls of the reservoir.

In accordance with another advantageous feature of the present invention, the armature 19 passages 31 are of a unique C-shaped cross-sectional configuration so as to provide for non-tortuous flow of fuel oil past the armature without a significant increase in the cross-sectional area and/or length of the magnetic gaps 43 and 44. For this purpose, the circumferential width of each of the passages 31 at the periphery of the armature is less than the maximum circumferential width of such passage in the interior of the armature (see FIG. 4).

In view of the foregoing, it is seen that the present invention brings to the art a new and improved solenoid pump 10 particularly constructed to keep from generating noise or excessively compressing the upper spring 41 in the absence of a hydraulic load. Advantageously, this is accomplished by reversing the directional effect of the magnetic force generated by the magnetic circuit in the pump to urge the armature 19 downwardly instead of upwardly once the armature passes upwardly of a selected position in the pumping chamber 17.

We claim:

1. In a solenoid-actuated fluid pump including means defining a pumping chamber having inlet and outlet ends movable means mounted within said pumping chamber and adapted for reciprocation in an axial direction about an at rest position between normal upper and lower limits under hydraulic load to pump fuel through the chamber, said movable means including an armature, a magentic coil associated with said armature and operable when energized to move said movable means, a source of current connectable with said coil for intermittently energizing the coil, magnetic circuit means defining a magnetic flux path around said coil when energized, said magnetic circuit including magnetic upper and lower gaps adjacent opposite ends of said armature, said flux path including first and second portions through said upper and lower gaps, respectively, said first portion having a rate of change in reluctance with upward armature movement greater than a simultaneous rate of change in reluctance of the second portion when said armature is below said preselected position and less than the simultaneous rate of change of the reluctance of the second gap when said armature is above said preselected position, and a magnetic member within said magnetic circuit above said upper gap, said member having a section adapted for magnetic saturation after initial upward movement of said armature beyond said at rest position of said armature.

2. A solenoid-actuated pump as defined by claim 1 wherein said section of said magnetic member comprises an annular lip protruding downwardly from said member toward said armature.

3. A pump as defined in claim 1 including a structural member in the flux path at said lower gap, said structural member being shaped to greatly increase the lower air gap as the armature moves a predetermined distance beyond said at rest position of the armature.

4. A pump as defined in claim 1 wherein said structural member is cylindrical with a hollow passage for said armature and has a shoulder providing an increased diameter hollow passage to provide said increase in the lower air gap.

5. A solenoid-actuated pump as defined by claim 1 including a plurality of passages extending in a generally axial direction through the armature, each of said passages opening from opposite ends of said armature and along the length of said armature from the outer surface thereof, each of said passages further having a cross-sectional configuration whereby the opening of said passage from the outer surface of said armature is narrower than the major width of the cross-sectional area of said passage.

6. A pump as defined in claim 7 wherein said passages have a generally C-shaped cross-section.

7. In a solenoid-actuated pump including means defining a pumping chamber having inlet and outlet ends, movable means mounted within said pumping chamber and adapted for reciprocation in an axial direction about an at rest position between normal upper and lower limits under hydraulic load to pump fuel through the chamber, said movable means including an armature, a magnetic coil associated with said armature and operable when energized to move said movable means, a source of current connectable with said coil for intermittently energizing the coil, magnetic circuit means defining a magnetic flux path around said coil when energized, and a plurality of passages extending in a generally axial direction through the armature, each of said passages opening from opposite ends of said armature and along the length of said armature from the outer surface thereof, each of said passages further having a generally C-shaped cross-sectional configuration whereby the opening of said passage from the outer surface of said armature is narrower than the major width of the cross-sectional area of said passage.

* * * * *

UNITED STATES PATENT AND TRADEMARK OFFICE
CERTIFICATE OF CORRECTION

PATENT NO. : 4,308,475
DATED : December 29, 1981
INVENTOR(S) : PAUL J. HAECK

It is certified that error appears in the above-identified patent and that said Letters Patent are hereby corrected as shown below:

Column 9, line 11, after "ends" insert --,--;
          line 16, change "magentic" to --magnetic--;
          line 21, before "said" insert --said armature having a preselected position in said pumping chamber whereat the magnetic force generated by said circuit is neutral,--;
          line 30, cancel "gap" and insert --portion--;

Column 10, line 12, change "the" (second occurrence) to --an--.

Signed and Sealed this

Tenth Day of August 1982

[SEAL]

Attest:

GERALD J. MOSSINGHOFF

Attesting Officer     Commissioner of Patents and Trademarks